June 6, 1967 J. F. MASON ETAL 3,323,840
AERATION BLANKET
Filed Feb. 1, 1965 2 Sheets-Sheet 1
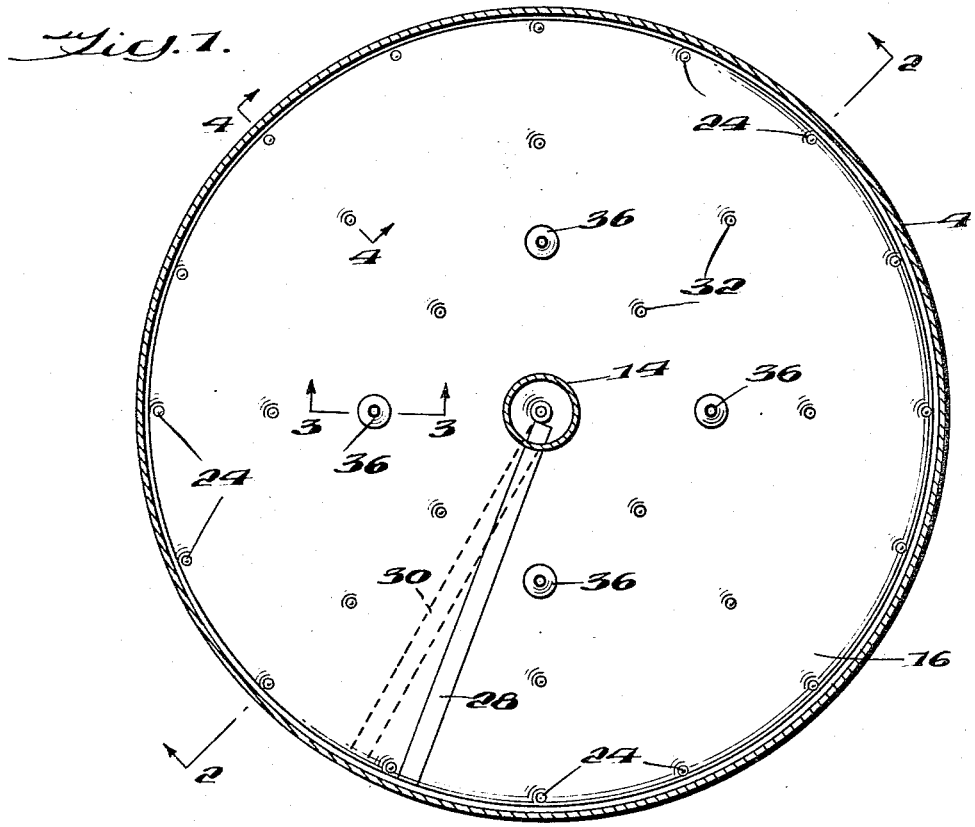
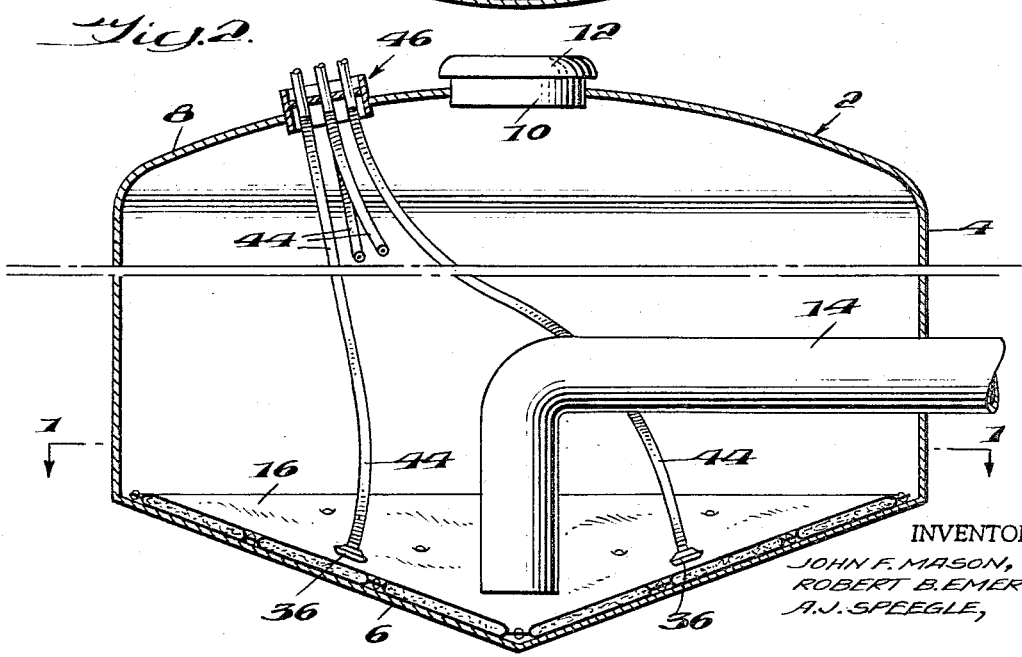
INVENTORS
JOHN F. MASON,
ROBERT B. EMERY,
A. J. SPEEGLE,
BY
ATTORNEYS June 6, 1967 J. F. MASON ETAL 3,323,840
AERATION BLANKET
Filed Feb. 1, 1965 2 Sheets-Sheet 2
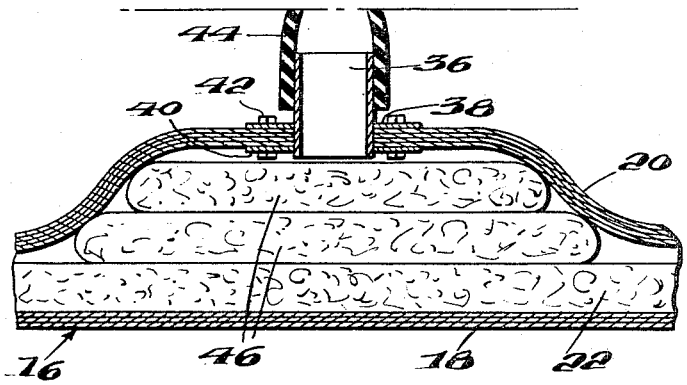
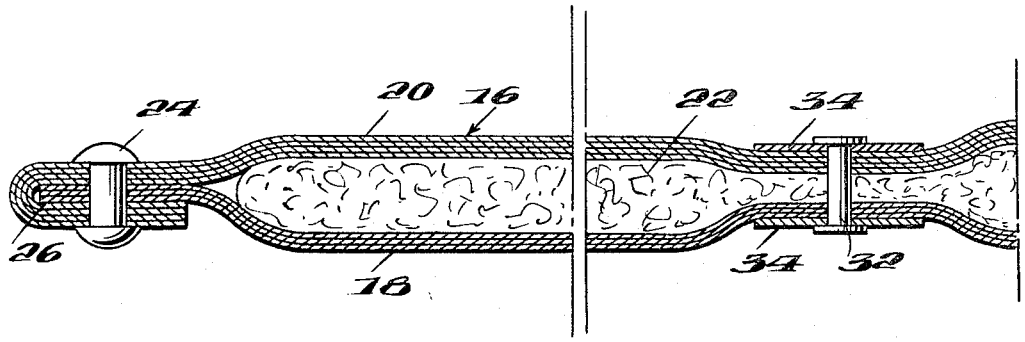
INVENTORS
JOHN F. MASON,
ROBERT B. EMERY,
A. J. SPEEGLE,
BY
Burns, Doane, Benedict, Swecker & Mathis
ATTORNEYS

United States Patent Office 3,323,840
Patented June 6, 1967

3,323,840
AERATION BLANKET
John F. Mason, Robert B. Emery, and A. J. Speegle, Duncan, Okla., assignors to Halliburton Company, Duncan, Okla., a corporation of Delaware
Filed Feb. 1, 1965, Ser. No. 429,382
4 Claims. (Cl. 302—53)

This invention relates to dispensing pulverulent materials, and more particularly, to an aeration device for fluidizing and dispensing pulverulent materials from a tank.

Pulverulent solid materials, such as cement, may be dispensed from a closed tank by fluidizing the material and causing the pulverulent material to flow out of the tank through a discharge pipe in a fluidized stream. Usually, the interior of the tank is pressurized to cause a stream of air to flow into the discharge pipe and the air stream sweeps along with it the particles of pulverulent material adjacent the mouth of the pipe. Air may be supplied to the tank through a diffuser, either suspended above the tank bottom, or integral with the tank bottom. In the latter type of diffuser, air is blown upwardly to fluidize the particles immediately above the bottom of the tank, and the material flows readily into the discharge pipe.

Storage tanks for pulverulent material usually have conical bottoms, which causes the material to gravitate toward the center, where the discharge pipe is located. In an attempt to reduce the overall height of the tanks, it has been proposed to reduce the cone angle of the bottom. However, if the ratio of the diameter of the tank to the diameter of the discharge pipe is very large, there is a tendency for the material to cake around the periphery of the bottom, unless the fluidizing air stream extends out to the periphery of the bottom.

Another difficulty with storage tanks in which an aerating surface is permanently mounted in the bottom is that the tank would not be suitable for holding liquids. If the storage tank could be readily converted from a pneumatic discharge tank to a liquid storage tank, the tank could be utilized more efficiently. Furthermore, if the aerating surface is permanently installed in the bottom of the tank and it becomes damaged, it may be awkward or impractical to repair or replace it without taking the tank apart.

Accordingly, it is an object of this invention to provide an aeration device which efficiently and effectively fluidizes pulverulent material in a storage tank.

It is a further object of this invention to provide an aeration device which readily converts a liquid storage tank into a pneumatic discharge storage tank for dry pulverulent material.

It is a still further object of this invention to provide an aeration device which avoids caking of pulverulent material along the peripheral edge of the bottom of the storage tanks.

It is another object of this invention to provide an aerating device which may be removed readily from the tank for repairs or replacement without taking the tank apart.

These objects are accomplished in accordance with a preferred embodiment of the invention by an aeration device including an aeration blanket shaped to overlie substantially the entire bottom of a tank. The upper surface of the blanket is formed by several layers of porous fabric, and the lower surface is formed of sheet material and is impervious. The sheet material and the fabric layers are secured together along the edge of the blanket by stitching and by a plurality of grommets at spaced intervals. The interior of the blanket contains a fibrous filler material. Rivets extend through the sheet material and the fabric at various points spaced from the edge of the blanket to prevent excessive billowing or expansion of the blanket when air is introduced to the interior of the blanket.

One or more air inlet couplings are provided in the upper surface of the blanket. The couplings are adapted to receive a rubber hose or other conduit means. The blanket may be rolled up and inserted into the tank through a hatch opening or a manway. The blanket is then unrolled to cover the bottom of the tank and hoses which extend through a fitting in the wall of the tank are fastened to the air inlet couplings in the blanket. The tank is then filled with pulverulent material. When it is desired to empty the tank, air is pumped through the hoses to the interior of the blanket where it is distributed through the filler material and flows upwardly through the cloth fabric at a substantially uniform pressure. Since the blanket covers substantially the entire bottom of the tank, caking of the pulverulent material is avoided. Furthermore, since there are no openings in the tank bottom, it can be utilized for storing liquids by removing the blanket and hoses.

This preferred embodiment is illustrated in the accompanying drawings in which:

FIG. 1 is a cross sectional view of a conventional tank along the line 1—1 in FIG. 2, with the aeration device of this invention installed therein;

FIG. 2 is a cross sectional view of the tank along the line 2—2 in FIG. 1;

FIG. 3 is an enlarged cross sectional view of the aeration blanket along the line 3—3 in FIG. 1; and FIG. 4 is an enlarged cross sectional view of the aeration blanket along the line 4—4 in FIG. 1.

Referring to FIG. 2, a typical storage tank 2 has a cylindrical side wall 4 and a conical bottom 6 secured along its peripheral edge to the side wall 4. A dome 8 encloses the top of the side wall 4 and a hatch 10 provides access to the interior of the tank 2. The hatch 10 has a cover 12, so that the interior of the tank may be pressurized. A discharge pipe 14 is mounted in the tank 2 in any suitable manner and extends from the center of the tank outwardly through the side wall 4.

The aeration device of this invention includes an aeration blanket 16 which is made of a size and shape to fit over the bottom 6 of the tank 2. As shown in FIGS. 1 and 4, the blanket 16 is circular and is formed of a plurality of layers of flexible sheet material. The bottom surface 18 of the blanket is impervious to air and is formed of several superimposed sheets of flexible material, at least one of which is impervious. The bottom surface preferably has two inner layers of plastic sheeting and an outer layer of weather proof canvas. The upper surface 20 of the blanket 16 has a plurality of layers of fabric and is sufficiently porous to allow air to flow through it, but the openings in the fabric are sufficiently small to prevent the pulverulent material in the tank from infiltrating the blanket through the openings in the surface 20.

The flexible blanket is filled with a fibrous, air-permeable filler 22, such as rubberized hair. The filler prevents the blanket 16 from collapsing under the weight of the material in the tank and assures good air distribution even when the tank is full. The peripheral edges of the upper and lower surfaces 18 and 20 are secured together by a double row of stitching and by a plurality of grommets 24 at spaced intervals around the peripheral edge. As shown in FIG. 4, the edge of the upper surface 20 is doubled over the edge of the lower surface 18, after dope or other sealer 26 has been applied around the edge of the lower surface 18 to render the edge airtight.

The grommets 24 extend through the blanket and clamp the edges of the upper and lower surfaces together to resist separation of the edges when the blanket is inflated.

In order to fit the conical tank bottom 6, the top and bottom surfaces 18 and 20, are cut in circular patterns and cut along a radius. The radial edges of the upper surface are then overlapped sufficiently to provide the desired cone angle, folded over each other and double-stitched in a similar manner to that shown in FIG. 4 to form a seam 28 in the upper surface. The same procedure is followed to fabricate a seam 30 in the lower surface. However, it is usually not necessary to provide the grommets 24 along the radial seams. The lower seam 30 is displaced from the upper seam 28 to avoid interference.

In order to prevent excessive ballooning of the blanket 16, a plurality or rivets 32 extend through the blanket 16 at various locations, for example, as shown in FIG. 1. The number and arrangement of the rivets depends upon the size of the blanket, but it has been found that generally the more rivets that are provided, the more effective the blanket is in fluidizing the particles in the tank. Flat washers 34 are mounted on the rivets on the outside of the surfaces 18 and 20, respectively. The flanges on the opposite ends of each rivet 32 restrict outward movement of the washers 34. Consequently, when the blanket is filled with air, the washers 34 prevent excessive expansion of the surfaces 18 and 20.

Air is supplied to the interior of the blanket 16 through a plurality of tubular couplings 36, as shown in FIG. 3. A radial flange 38 is welded or otherwise secured on the exterior of the coupling 36. The coupling extends through a circular opening in the upper surface 20 and a back-up washer 40 clamps the upper surface 20 against the flange 38. The back-up washer 40 and the flange 38 are secured together by bolts 42. A flexible tube or hose 44 through which air is supplied is secured on the tubular coupling 36 by any suitable means. The interior of the blanket 16 adjacent to each coupling 36 has additional layers 46 of filler material to assure good distribution of air throughout the interior of the blanket 16. The layers 46 are preferably circular and concentric with the coupling 36. To prevent displacement of the layers 46 after assembly, the layers 46 may be sewn together.

The air inlet coupling 36 which is illustrated in FIG. 3 is typical of the several couplings which are provided in the upper surface of the blanket 16, as shown in FIGS. 1 and 2. The number and arrangement of the couplings depend upon the size of the blanket. There should be a sufficient number of couplings to assure good air distribution throughout the area of the blanket. As shown in FIG. 2, an airtight connector device 46 is mounted in the dome of the tank through which air is supplied to the hoses 44. One end of each hose is coupled to the device 46 and the opposite end fits over one of the couplings 36. The arrangement of hoses shown in FIG. 1 is intended to be exemplary only. Any suitable arrangement for conveying air under pressure from the outside of the tank to the couplings 36 may be provided.

The blanket 16 may be installed in the tank 2 by folding it until it is small enough to pass through the hatch 10, and then unfolding it inside the tank. It is laid out on the bottom 6 as shown in FIG. 1, with the porous, air-permeable, upper surface 20 and the air inlet couplings 36 facing upwardly. The impermeable lower surface 18 rests on the bottom of the tank 6. The hoses 44 are then connected between the connector device 46 and the air inlet couplings 36 in the blanket 16. The tank then may be filled with dry pulverulent material.

To discharge the contents of the tank 2, air under pressure is supplied through the hoses 44 to the interior of the blanket 16. The air is distributed substantially uniformly in the blanket through the fibrous material 22. Due to the pressure differential, the air escapes from the interior of the blanket through the air-permeable upper surface 20, and flows through the pulverulent material with sufficient velocity to cause it to become fluidized directly above the upper surface 20. The air flows out of the tank 2 through the discharge pipe 14 and the fluidized particles around the mouth of the discharge pipe are suspended in the air stream which flows into the discharge pipe. Air flowing out of the portions of the blanket that are remote from the discharge pipe 14 causes the particles to migrate toward the discharge pipe. Since the blanket 16 covers almost the entire area of the bottom of the tank 6, bridging of the material is substantially eliminated. Consequently, the flow rate of the material through the discharge pipe 14 is uniform and surging does not normally occur. The shape and arrangement of the blanket also assures efficient and substantially complete removal of the pulverulent material from the tank 2.

As shown in FIGS. 2 and 4, the marginal edge of the blanket 16 lies substantially in the plane of the blanket when it is installed in a tank. If the material forming the upper and lower surfaces 20 and 18, respectively, is sufficiently flexible, the marginal edge of the blanket 16 may be folded under the lower surface 18 when the blanket is installed in a tank. When the marginal edge is folded under in this manner, the blanket 16 may be slightly larger than the internal diameter of the tank, so that the folded edge lies in close proximity to the side wall 4 of the tank.

As an example of a preferred aeration device in accordance with this invention, four thicknesses of cotton duck were used in the upper surface 20 of the aeration blanket 16. The upper surface had a permeability of about 14.4 cubic feet per minute per square foot of surface at a pressure differential of 2 inches of water pressure. The lower surface 18 had two inner layers of plastic sheeting and an outer layer of weatherproof canvas to resist abrasion. A flat bottom tank having an aerating blanket installed therein in accordance with this invention and filled with dry cement was efficiently unloaded. The tank was unloaded through a 4 inch diameter discharge pipe at the rate of 30 sacks of cement per minute. Sufficient air was supplied through the upper surface 20 of the aeration blanket 16 to maintain the pressure in the tank at 10 p.s.i.g.

One advantage of the aeration device of this invention is that existing tanks may be readily converted for penumatic handling of dry, pulverulent material. Since the blanket 16 is flexible, it may be folded to pass through the hatch 10 of the tank 2. Since it is easily removable, the blanket may be repaired or replaced without taking the tank apart. Another advantage of the removable blanket 16 is that the same tank may be used for storing either liquids or dry pulverulent material.

While this invention has been illustrated and described in one embodiment, it is recognized that variations and changes may be made therein without departing from the invention as set forth in the claims.

We claim:
1. An aeration device comprising an upper surface and a lower surface, means for securing together the marginal edges of said surfaces to form an air chamber therebetween, said upper surface being flexible and air permeable, said lower surface being flexible and impermeable, said chamber extending substantially continuously throughout the space bounded by said marginal edges, means for restricting the separation between said surfaces, said restricting means including a plurality of rivets extending through said upper and lower surfaces, said rivets being spaced apart a sufficient distance to allow separation of said surfaces between said rivets and air circulation between said surfaces, filler material extending substantially throughout said chamber, and means for conducting air into said chamber, said device being substantially equally foldable along randomly selected fold lines, whereby air flows outwardly through the upper surface for fluidizing particles.

2. An aeration device comprising an upper surface and a lower surface, said upper and lower surfaces being substantially circular, each of said surfaces having a radial seam forming each surface in a hollow cone, means for securing together the marginal edges of said surfaces to form a chamber therebetween, said upper surface being flexible and air permeable, said lower surface being flexible and impermeable, said chamber extending substantially continuously throughout the space bounded by said marginal edges, a plurality of rivets, said rivets extending through said upper and lower surfaces and being secured thereto, said rivets being spaced a sufficient distance to allow separation of said surfaces between said rivets and air circulation between said surfaces, and means for conducting air into said chamber, said device being substantially equally foldable along randomly selected fold lines, whereby air flows outwardly through the upper surface for fluidizing particles.

3. An aeration device comprising an upper surface and a lower surface, said upper surface overlying said lower surface, the marginal edge of one of said surfaces overlapping on the opposite side of the marginal edge of the other of said surfaces, stitching extending along and securing together said marginal edges, sealing means between said marginal edges, a plurality of grommets extending through and securing together said marginal edges, said upper and lower surfaces forming an air chamber therebetween, said upper surface being flexible and air permeable, said lower surface being flexible and impermeable, said chamber extending substantially continuously throughout the space bounded by said marginal edges, means for restricting the separation between said surfaces, said restricting means including a plurality of rivets extending through said upper and lower surfaces and being secured thereto, said rivets being spaced apart a sufficient distance to allow separation of said surfaces between said rivets and air circulation between said surfaces, and means for conducting air through said upper surface into said chamber whereby air flows outwardly through the upper surface for fluidizing particles.

4. An aeration device comprising an upper surface and a lower surface, means for securing together the marginal edges of said surfaces to form an air chamber therebetween, said upper surface being flexible and air permeable, said lower surface being flexible and impermeable, said chamber extending substantially continuously throughout the space bounded by said marginal edges, a plurality of rivets extending through said upper and lower surfaces and having flanges on opposite ends, washers on the rivets between said flanges and said upper and lower surfaces, respectively, said rivets being spaced apart a sufficient distance to allow separation of said surfaces between said rivets and air circulation between said surfaces, filler material substantially filling said chamber, the combined thickness of said surfaces and said filler material being substantially uniform, and means for conducting air through said upper surface into said chamber, said device being substantially equally foldable along randomly selected fold lines, whereby air flows outwardly through the upper surface for fluidizing particles.

References Cited

UNITED STATES PATENTS

| | | | |
|---|---|---|---|
| 2,805,897 | 9/1957 | Yellott | 302—29 |
| 2,943,891 | 7/1960 | Paton | 302—29 |
| 3,061,379 | 10/1962 | Lusted | 302—29 |
| 3,073,651 | 1/1963 | Leimegger | 302—29 |

ANDRES H. NIELSEN, *Primary Examiner.*

EVON C. BLUNK, *Examiner.*

A. L. LEVINE, *Assistant Examiner.*